United States Patent [19]
Martins

[11] Patent Number: 4,726,704
[45] Date of Patent: Feb. 23, 1988

[54] ANNULAR CLAMPING MEMBER

[76] Inventor: Børge Martins, Brahms Allee 35[12], D-2000 Hamburg, Fed. Rep. of Germany

[21] Appl. No.: 740,071
[22] PCT Filed: Sep. 21, 1984
[86] PCT No.: PCT/DK84/00093
 § 371 Date: May 21, 1985
 § 102(e) Date: May 21, 1985
[87] PCT Pub. No.: WO85/01331
 PCT Pub. Date: Mar. 28, 1985

[30] Foreign Application Priority Data
Sep. 21, 1983 [DK] Denmark .............................. 4309/83

[51] Int. Cl.[4] ........................... B25G 3/10; F16B 2/22
[52] U.S. Cl. .................................... 403/372; 403/370; 403/371
[58] Field of Search ..................... 403/370, 371, 372

[56] References Cited
U.S. PATENT DOCUMENTS 3,112,116 11/1963 Seitz .................. 403/370 X
3,578,364 5/1971 Ehrenberg ................ 287/52
3,995,967 12/1976 Haller .................. 403/370

FOREIGN PATENT DOCUMENTS 1008536 5/1957 Fed. Rep. of Germany .
1254913 11/1967 Fed. Rep. of Germany .
82/00325 2/1982 PCT Int'l Appl. .

OTHER PUBLICATIONS

Derwent's abstract No. B 7199 E/07, SU 826 118 (Gear Cons. Res. Inst.), May 10, 1981.

Primary Examiner—Andrew V. Kundrat
Attorney, Agent, or Firm—Marmorek, Guttman & Rubenstein

[57] ABSTRACT

An annular clamping member adapted, for example, to clamp a gear or a pulley to a plain shaft has a ring of alternately arranged primary and secondary sections (1 and 2) mutually interconnected by means of inclined ring portions (12) which, by a forced mutual displacement of the primary and secondary sections, are caused to change their inclination whereby an increase or decrease of the diameters of the clamping member is obtained.

Such a clamping member may be used for clamping a transmission element exactly coaxially to a shaft or may be formed as a hub of such a transmission element.

9 Claims, 13 Drawing Figures

ANNULAR CLAMPING MEMBER

FIELD OF THE INVENTION

This invention relates to an annular clamping member adapted, for example, to grip a shaft, or, after distension to abut an inner annular surface, which has a circumferential length changeable by mutual axial displacement of its parts which are evenly distributed alternately to two opposite radial faces in opposite directions away from their positions when the clamping member is unlocked.

DESCRIPTION OF PRIOR DISCLOSURES

A clamping member of this type is known, for example, from Russian Patent specification No. 826,118 which describes a clamping member consisting of a flat, relatively thin spring ring having alternately on its two faces, evenly distributed protruding parts. This ring is adapted to be inserted between an end face of an element arranged on a shaft and an abutment ring axially displaceable towards said end face. Such a displacement of the abutment ring will result in the protruding parts being pressed axially in opposite directions, whereby the ring is given a zigzag shape causing a reduction of its circumferential length and, consequently, of its inner and outer diameters, thus causing the ring to lock upon the shaft. To sufficiently reduce the ring's inner diameter, it is necessary, however, even if for a reduction of diameter of only a fraction of one mm, to subject the ring to an axial deformation of many times its thickness. This is because the ring portions slanting relative to radial planes and formed by deformation have to form an angle to the radial planes of between 10° and 15°. Such a strong deformation severely stresses the material of the spring ring. Any additional deformations have to be avoided if the radial pressures against the shaft obtained by the deformation have to be sustained. Therefore, the ring has to be relatively thin. This limits radial pressures against the shaft it is possible to obtain, since owing to the radial pressures the elastic deformations of the ring material will again reduce the pressures. Accordingly, this prior art device is suitable only for use in small machineries wherein only minor torques have to be transmitted.

FEATURES AND ADVANTAGES OF THE INVENTION

The annular clamping member according to the present invention comprises two sets of sections, a primary and a secondary section alternately arranged at its two opposite axially facing ends, each of which sections is interconnected with the two adjacent sections of the other set by means of ring portions slanted relative to radial planes whose slope can be varied by a forced axial displacement of the two sets of sections relative to each other. Because of the slope of the ring portions relative to the axial direction, and provided the angle with the radial planes is greater than 15°, preferably between 20° and 45°, even a small mutual axial displacement of the two sets of sections will result in a relatively large change in the circumferential length of the inner as well as of the outer periphery of the clamping member. Further, it is possible to obtain a diameter reduction, for example to use the clamping of the member on a shaft, as well as a diameter increase, for example to use the member within a hub bore. This is because a diameter reduction is obtained, when the sections of the two sets are drawn in opposite directions, and a diameter increase is obtained when the two sets of sections are urged against each other. Further, since the unavoidable deformations of the parts are small, no greater demands on the yielding ability of the material used may be made, the clamping members may be given a relatively great axial dimension and/or be made from relatively thick material. As a result improved radial contact pressures between the clamping member and a shaft or a surrounding wall may be obtained making the clamping member useful even where strong torque effects are to be transferred. Moreover, the clamping member can be made from any solid material including wood and cast iron.

A further advantage of the clamping member according to the present invention is, that it may be made quite thin with a small outer diameter as compared with the center opening. Therefore, the clamping member is well suited to supplement the clamping members described, for example in the International Publication No. WO82/00325. Even the clamping member described therein ensures, contrary to those known clamping members which consist of a slotted bushing having a conical outer and/or inner face or of two intermeshing such bushings, the exact concentric fastening to a shaft by an axial pressing towards each other of discs provided with a truncated portion, whereby the inner diameter of the discs is reduced and their outer diameter enlaged. This clamping member, however, has an outer diameter that is relatively large compared with the inner diameter, wherefore in some cases such clamping members are not as generally useful as a clamping member according to the present invention.

An important advantage of a clamping member according to the present invention is that, as mentioned above, it can expand as well as contract. This causes for example, that a clamping member having a small clearance relative to a shaft may be brought at first to expand so that it can be applied to a shaft and, thereafter, by reversing the forces on the sections it can squeeze the shaft. This possibility is of great importance in practice. A corresponding effect has hitherto not been obtainable by clamping members adapted to secure an element to a shaft.

Further the clamping member can be fabricated so that a uniform section of the ring portions over the whole axial length of the clamping member can be ensured and, consequently, a uniform reduction (or increase) of the diameter of the whole length of the member can be achieved.

Similarly the clamping member can be so made that an already existing plane radial surface on another element cooperating with the clamping member may be used as an abutment member for the clamping member during the deformation thereof.

In another version the clamping member can have all its sections have an end face situated in the same radial plane which is a manufacturing advantage. The clamping member also can be made so that one and the same abutment may be used for the expansion as well as for the narrowing of the clamping member. This is advantageous where a clamping member having a small tolerance can be pushed in over a shaft and be positioned in the correct position thereon and then forcibly be clamped to the shaft.

The invention also contemplates that the clamping member be formed so that two clamping members together can serve as a shaft-coupling.

As previously mentioned, a clamping member according to this invention will provide the same change of its inner as of its outer diameter. In many cases it may be advantageous, however, if the clamping member may be brought simultaneously to exert inwardly as well as outwardly directed clamping forces, and according to the present invention this may be attained by another version thereof.

Such a clamping member may for example be used for securing to a shaft of a transmission member having a conical hub bore. Often it is preferred, however, in hubs, to use circular cylindrical hub bores. For such use the effect of conical abutment faces may be used, if the two sets of sections are displaced so that the sections of the inner clamping member are displaced in direction out of the outer clamping member the latter will try to expand, whereas the inner one will try to contract. Since the adjoining faces of the two members are conical the two clamping members will adapt one to another so that, if the one clamping member is pressed so firmly against the element meshing therewith that it is more difficult to displace it relative thereto than to displace the other clamping member relative to the element meshing therewith, it will be the sections at the relevant end of the last said member which displace themselves relative to the element cooperating therewith. Consequently, a uniform clamping of the double clamping member to both the elements cooperating therewith is ensured simultaneously with an exact concentric clamping of the two elements being ensured.

In another embodiment of the invention, the clamping member has various sections at the end of its inner clamping part which have their largest diameter provided with side projections opposite the sections at the opposite ends of the outer clamping part and each of the side projections has an opening for a bolt whose threaded part can be inserted in a threaded opening in the opposite section of the outer clamping member or in an axial projection of the last section of the clamping member.

In a still further embodiment of the invention, the clamping member has at the end where its inner clamping end has its smallest diameter an axially extending opening and elements extending in the outer and inner clamping parts of the clamping member.

DESCRIPTION OF BEST MODES OF THE INVENTION

Figure 1:
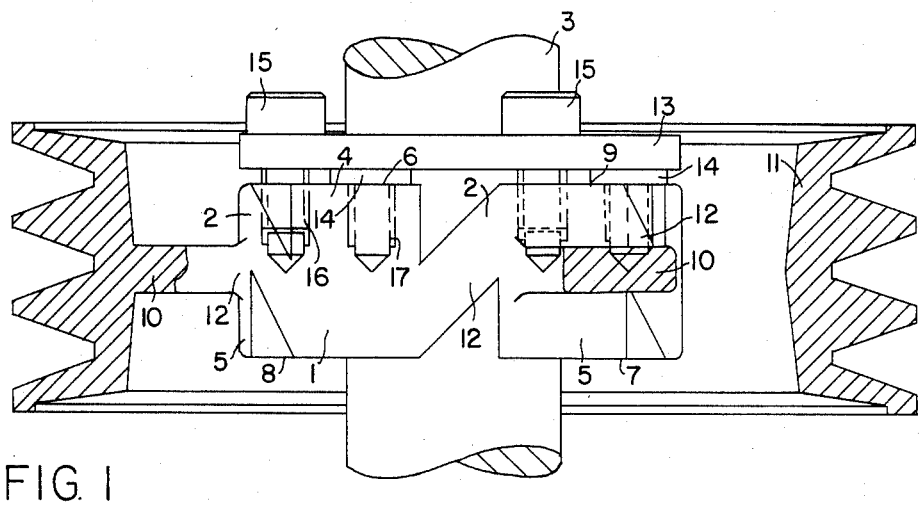
FIG. 1 is a partly cross-sectional side elevation view of an embodiment of a clamping member according to the present invention shaped as a hub clamped to a shaft.

The clamping member shown in FIGS. 1, 2, 12 and 13, wherein like numbers correspond to like parts, comprises an annular ring of alternately arranged primary sections 1 and secondary sections 2 and is adapted to be fastened to a plain shaft 3. Each section 1 and 2 is provided with an axial projection 4 and 5 the end faces 6 and 7 of which are flush with the end faces 8 and 9 of the other set of sections. The sections 2 have projections 5 and are united with spokes 10 of a transmission member 11, here shown as a V-belt pulley. Thus the clamping member constitutes a hub of this transmission member. Each section 1 or 2 of the one set is connected to the two adjacent sections of the other set by intermediate ring portions 12 forming opposite facing angles of between 15° and 60° preferably of between 20° and 45°, with radial planes the transition region of any portion 12 to the sections 1 and 2 extend preferably radially.

The clamping member cooperates with an abutment member 13 surrounding the shaft and in the embodiment shown in FIGS. 1, 2, 12, and 13, is shaped as a simple ring plate. The abutment member 13 is shown arranged outside the upwards facing end faces 6 and 9 of the clamping member. The underside of abutment member 13 is provided with spacers 14, which, depending on the angular orientation of the plate relative to the clamping member, may abut either the end faces 9 of the secondary sections 2 or the upwards facing end faces 6 of the projections 4. Between the spacers 14 the plate 13 is provided with plain holes through which bolts 15 may be screwed into either threaded holes 16 in the secondary sections 2 or in threaded holes 17 in the projections 4 of the primary sections 1.

Figure 13:
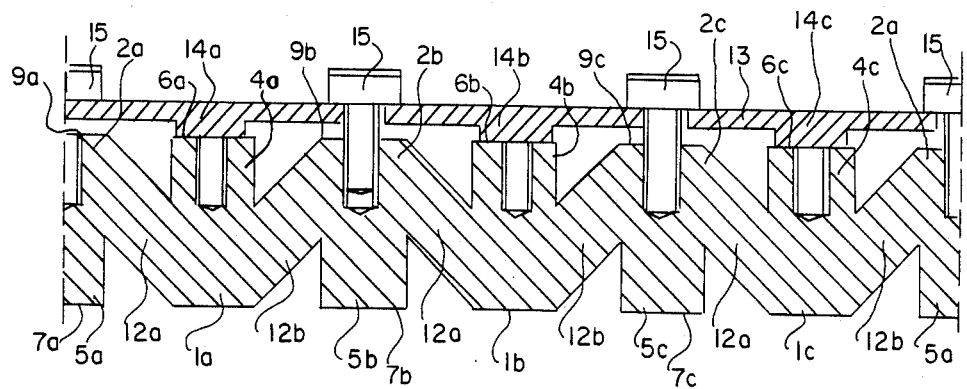
FIG. 13 is similar to FIG. 12 after rotation of the clamping member.

In FIGS. 1 and 13, the spacers 14 abut the end faces 6 of the projections 4, and the bolts 15 are screwed into the threaded holes in the secondary sections 2. Therefore, when the bolts 15 are tightened, the primary sections 1 will be fixed in place due to spacers 14, while the secondary sections 2 will move up and away from the primary section 1. Thus, the angle between ring portions 12 and projections 4 will decrease resulting in a reduction of the spaces between each two neighboring sections 1 and 2. This results in firm clamping of the clamping member and of the transmission member 11 to shaft 3.

Figure 12:
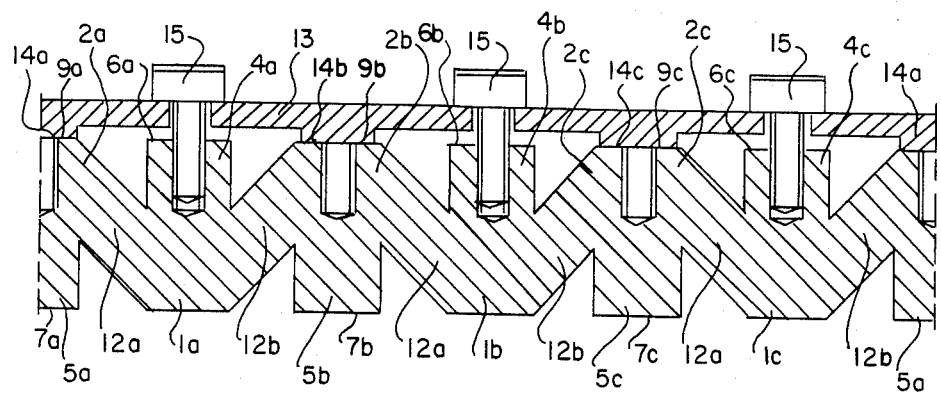
FIG. 12 is a sectional view of the clamping member of the invention shown in the FIGS. 1 and 2.

In case, however, the abutment member 13 is rotated about the shaft 3 to such a degree that its spacers abut the end faces 9 of the secondary sections 2 and the bolts 15 are brought into engagement with the threaded holes 17 in the projection 4 as shown in FIG. 12, secondary sections 2 will be fixed in place by spacers 14. Tighteining of bolts 15 will cause sections 1 to move upwardly causing the angle between ring portions 12 and projections 4 to increase. As a result, the spaces between sections 1 and 2 will increase, whereby the inner and the outer diameters of the clamping member are increased. This may be of importance where, compared with the diameter of the shaft 3, the inner diameter of the clamping member has only a minimal interference or none at all, since owing to the said increase of the diameters, it will nevertheless be easy to insert the clamping member on the shaft and to displace it to the exact position desired. This being reached, the bolts 15 may be removed and the abutment member rotated until its spacers are positioned opposite to the projections 4, whereafter a tightening of the bolts will result in a diminishing of the inner diameter of the clamping member and ensure its clamping to the shaft 3.

Where it is not necessary to increase the diameters of the clamping member the projection 4 may be given a greater length so that an abutment member without spacers will always abut the end faces 6 of the projections 4 and be kept at a distance from the secondary sections 9, which then do not need to be provided with threaded holes.

Instead of spacers 14 fastened to the abutment member 13 separate spacers may be used and arranged where desired.

Finally the clamping member may be shaped in such a manner that its two ends are identical so that an orientation of the clamping member in a certain direction is unnecessary.

The above described possibility of increasing the diameters of the clamping members results in that the member may be brought to expand against the inner side of a pipe or another surrounding cylinder surface, for example a hub bore.

The clamping member may assume various forms. Thus it may be polygonal instead of cylindrical, and its inner or outer side may be conical instead of circular or cylindrical. Besides, the dimensions, including the width and axial length of the sections 1 and 2 and the thickness of the slanting ring portions 12 need not merge with the cylindrical or conical faces defined by the sections 1 and 2.

Figure 2:
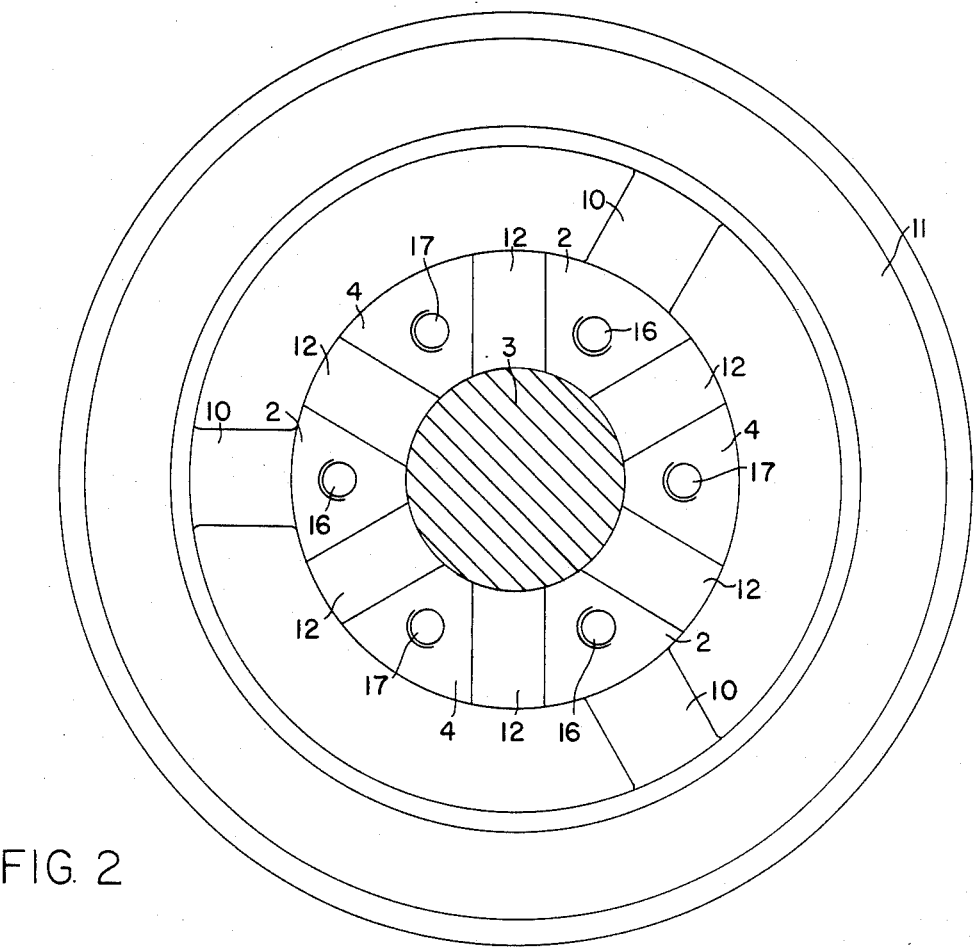
FIG. 2 is a corresponding front elevational view.
Figure 3:
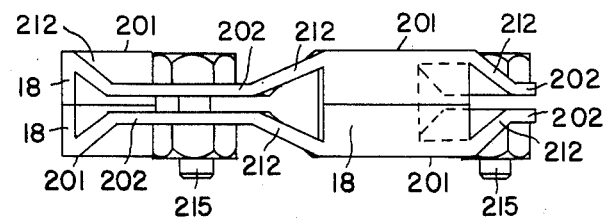
FIG. 3 is a side elevational view of a clamping member which can be used as a coupling between two shafts.

FIG. 3 shows a double clamping member comprising two symmetrically arranged clamping members, each based on the same principal as the clamping members of FIGS. 1 and 2 but made by bending a relatively thick plate as material. Each plate ring has alternately situated mainly plane wave crests 201 and wave troughs 202, corresponding to the primary and secondary sections 1 and 2 in FIGS. 1 and 2, and mutually interconnected by inclined ring portions 212. At the outer circumference of the member the wave crests 201 are coherent with webs 18 extending downwards and upwards respectively to the center or plane of symmetry of the clamping member and abutting each other in this plane so that the rings serve as abutment members for each other. The two rings are held together by means of bolts 215 corresponding to the bolts 15 in FIGS. 1 and 2. Such a double clamping member for example may be used for coupling together two shaft ends. Such use can neutralise possible minor differences in the diameters of the two shafts. Provided the webs 18 are fastened to each other at their joining faces, even greater diameter differences may be neutralized simultaneously with the two shaft ends being coaxially secured.

Figure 4:
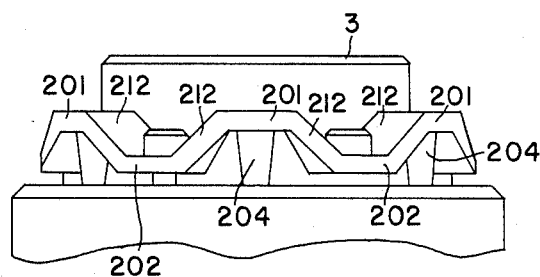
FIG. 4 is a side elevational view of a clamping member according to the present invention adapted to be fastened to a radial surface.

FIG. 4 shows a clamping member corresponding to a single one of the two cooperating members shown in FIG. 3 with webs 18 being left out. Instead, a projection 204 extends axially from each wave crest and has its end situated outside the common plane at the end faces of the wave troughs 202. These projections 204 abut a radial and wall of an element 19, for example a hub, that has to be secured to a shaft 3 and to which the clamping member is connected by means of bolts 215 carried through plain holes in the wave troughs 202 and screwed into threaded holes in the said wall of the element 19.

Figure 5:
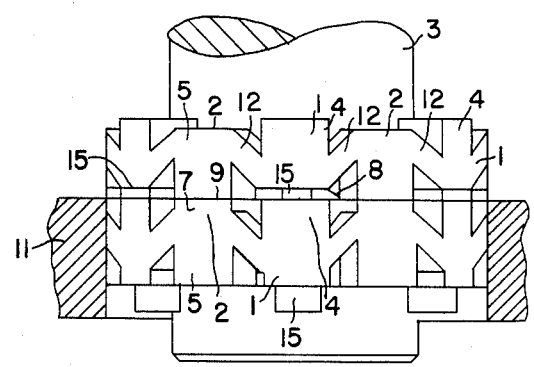
FIG. 5 is a view corresponding to FIG. 4 of two clamping members and adapted to clamp, for example, a pulley to a shaft.

FIG. 5 shows how a double clamping member mainly consisting of two clamping members of the type shown in FIGS. 1 and 2, may be used for clamping of an element 11, for example a transmission element, to the clamping member as well ast to clamp the latter to a shaft 3. The lower clamping member shown in FIG. 5 is inserted in, for example, a hub bore and is made in the same manner as the clamping member according to FIGS. 1 and 2, though the primary sections 1 and their projections 4 are provided with through axial plain holes for the bolts 15 the threaded parts of which are screwed into threaded holes in the primary section 1 of the upper clamping member. The end faces 8 of section 1 are somwhat recessed relative to the end faces 7 of the projections 5 of the secondary sections 2. These last said end faces 7 abut the end faces 9 of the secondary sections 2 of the lower clamping member. When the bolts 15 are tightened the upper clamping member will be contracted and clamped to the shaft 3 whereas the lower clamping member will be expanded and thereby clamped within the hub bore of the element 11. The two clamping members may also be made in one single piece.

Figure 6:
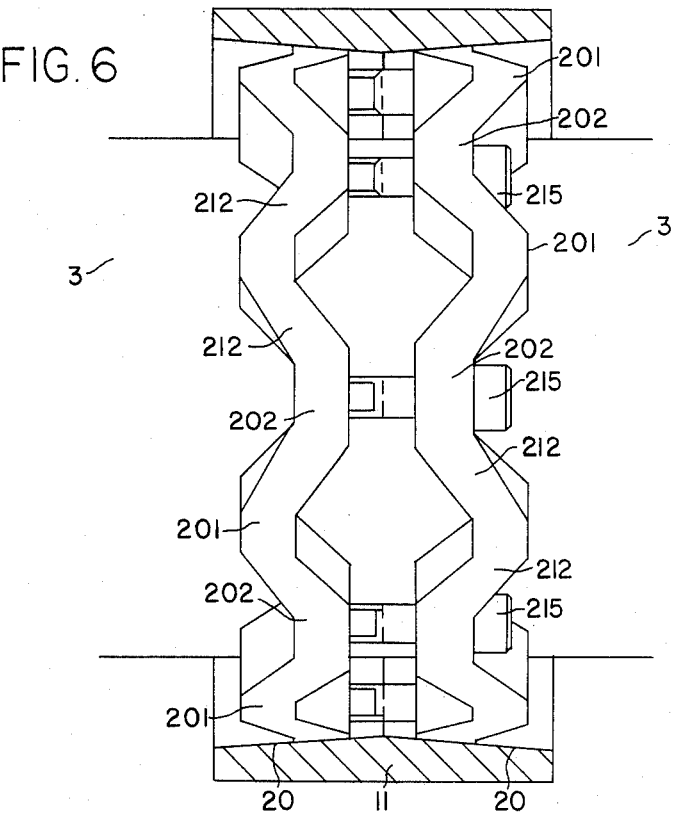
FIG. 6 is a corresponding view of the two cooperating clamping members for securing, for example, a pulley to a shaft.

FIG. 6 shows how two clamping members of the type shown in FIG. 4 may be used for clamping of, for example, a transmission element 11 onto a shaft 3 by being arranged within a hub bore. For this purpose the abutment member which in FIG. 4 is constituted by a hub end wall, is replaced by conical engagement faces 20 for the clamping member. The inner circumferential face of the hub bore is constituted by two oppositly directed truncated cone faces having a small apex angle, whereas the outer circumferential faces of the two clamping members are correspondingly conical. By tightening of the bolts 215 interconnecting the wave troughs 202 the two clamping members will contact about the shaft 3 and wedge into the hub bore so that the parts are interconnected immovably relative to each other.

Figure 7:
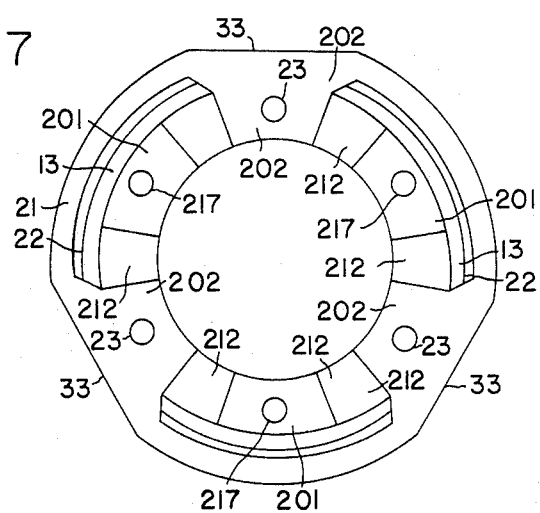
FIG. 7 is a front elevational view of a clamping member able simultaneously to clamp inwards as well as outwards.

FIG. 7 shows schematicallyh a clamping member of the type shown in FIG. 4 but shaped in such a manner that simultaneously it may clamp inwardly, for example about a shaft, and outwardly, for example against the inner wall of a hub. In this embodiment the wave crests 201 and the adjoining inclined ring portions 212 are punched and pressed out from a disc 21 so that opposite said parts, the disc is provided with an opening 22, whereas the disc portions between these openings constitute the wave troughs or secondary sections 202. Behind the disc 21 an abutment member 13 is arranged abutting the wave troughs 202 but only partly covering the openings 21. This butment member 13 may be secured to the disc 21 by means of bolts 23 screwed into the wave troughs. Through threaded holes 217 in the wavecrests 201 bolts (not shown) may be screwed against the abutment member 13, whereby the wave crests 201 may be forced away from the abutment member. The disc 21 is made from an elastic material and mainly is circular and cylindrical. Opposite to the wave troughs 202, disc 21 is provided with outer flats 33. By pressing the wave crests 201 away from the abutment member the disc 21 will expand owing to the openings 22 and may, consequently, be brought firmly to contact a surrounding wall, whereas the inner part of the disc 21 will be reduced in inner diameter by the same pressing action.

Figure 8:
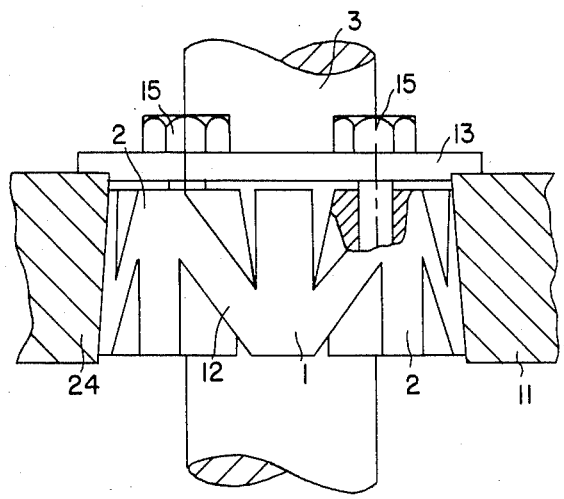
FIG. 8 is a side elevational view of a further embodiment of a clamping member of this invention.
Figure 9:
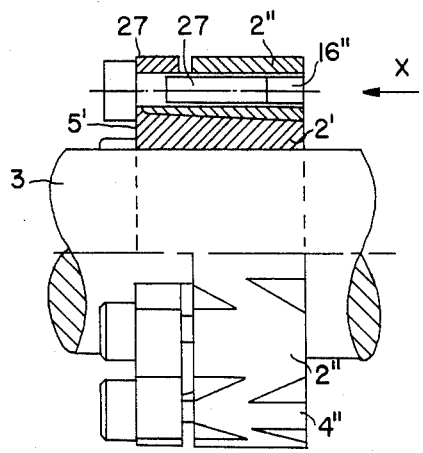
FIG. 9 is a side elevational view, partly in section, of an embodiment of the clamping member of this invention comprising a first clamping member and a second clamping member surrounding the first one.
Figure 10:
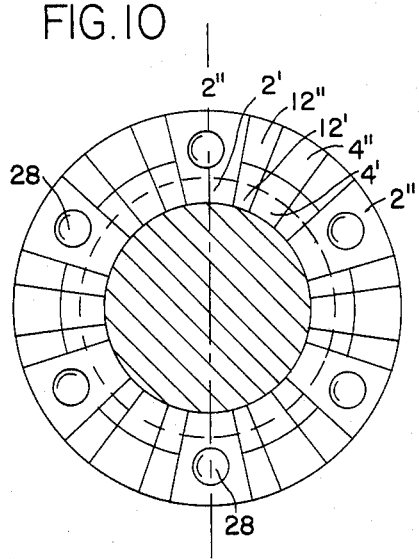
FIG. 10 is an elevational view seen in direction of the arrow X in FIG. 9.

FIG. 8 shows a clamping member of the same type as that shown in FIGS. 1 and 2, but provided with a conical outer side fitting into an inwardly conical and outwardly cylindrical intermediate bushing 24 that in a manner known per se, but nowt shown, is provided from both ends in between each other with extending slots shorter than the width of the bushing. The bushing which is elastic, is adapted to be inserted in a hub bore of a transmission element (not shown). The clamping member itself consists of alternating arranged sections 1 and 2 and inclined ring portions inbetween. A disc-like abutment member 13 abuts the thick end of the bushing 24 and is provided with bolts 15 screwed into the secondary sections 2 so that by tightening of said bolts these sections 2 are drawn in direction of the abutment member 13. This effect is counteracted, however, by the mutually meshing conical faces of the bushing and the clamping member. Thus, as explained above, by tightening the bolts the clamping member will be brought simultaneously to clamp the shaft 3 and to press outwards against the bushing 24, thus causing also the latter to expand and being sqeezed in the hub bore, FIGS. 9 and 10 show an embodiment of a double clamping member of this invention shaped to form a spacer bushing to be inserted between a shaft 3 and the inner side of a hub bore (not shown). This spacer bushing comprises two clamping members 25 and 26 of the type shown in FIG. 1, of which the inner one 25 is provided with a conical outer side, whereas the outer one is provided with a cylindrical outer side and a conical inner side of the same magnitude and with the same conicity as the outer side of the inner member 25. To identify single parts of the two members 25 and 26 there are used the same reference numbers as used in FIG. 1 but having added thereto, as far as the features of the member 25 is concerned: —'—; and as far as the member 26 is concerned:—"—. The two members are mutually arranged in such a manner that corresponding parts of the two members are situated opposite each other, that is that the sections 1' of the inner member 25 are situated opposite the sections 1" of the outer member 26, and the same is the case for the sections 2' of the 2". The projections 5' of the secondary sections 25' of the inner clamping member 25 are provided with radially extending eyes 27 not extending outside the outer side of the clamping member 26 and arranged opposite the inner ends of the secondary sections 2" of the outer clamping member 26. These sections are not provided with projections corresponding to the projections 5. The eyes 27 are provided with axially extending plain bolt holes for receiving bolts 28 screwed into threaded holes 16" in the secondary section 2" of the outer clamping member.

When the bolts 28 are tightened, the secondar sections 2" of the outer clamping member 26 will be drawn in direction of the corresponding primary sections 1", so that the outer clamping member will expand, but, simultaneously, the primary sections 1' of the inner clamping member 25 will be drawn in direction of the corresponding secondary sections 2', so that the inner clamping member is contracted and clamped to the shaft 3. The expansion of the outer clamping member 26 results in this clamping member being fixed within the hub bore (not shown) wherein the double clamping member has been inserted.

Figure 11:
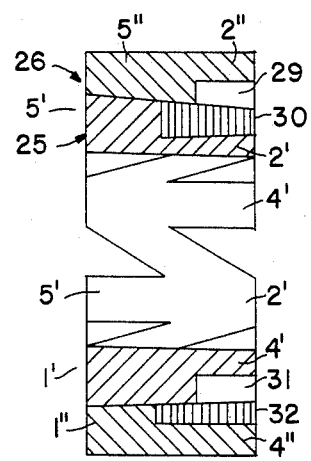
FIG. 11 is a sectional view of another embodiment of a double clamping member of this invention.

A cross section of a corresponding spacer bushing forming double clamping member is shown in FIG. 11. In this embodiment, however, each clamping member 25 and 26 is at each end provided with three sections 1 and 2 only, whereas in the embodiment shown in FIGS. 9 and 10 there are six sections at each end. In the embodiment shown in FIG. 11, at the transition between the abutting sections 2' and 2" a hole is bored from the adjoining end face which is partly in the other of the two clamping members. The part 29 of the hole situated in the section 2" is plain, whereas the part 30 thereof situated in section 2' is threaded and is somewhat longer than part 29. When bolts are screwed into these holes and the end of such a bolt reaches the bottom of the corresponding hole part 29, sections 2" will be pushed to the left in the drawing whereby the outer clamping member 26 will expand simultaneously with sectins 2' being drawn to the right, whereby the inner clamping member 25 will contract.

Further from the same end face as the holes 29, 30 at the transition between the extensions 4' and 4" of the sections holes 31, 32 are made. It is parts 31 of the holes situated in projections 4' of the inner clamping member which are plain, whereas the parts 32 situated in the projections 4" are threaded and are longer than hole part 31. The same bolts may be used for the two sets of holes 29, 30 and 31, 32. As a result of this, it is only necessary to unscrew the bolts from holes 29, 30 and then to screw them into holes 31,32, when the formed bushing has to be loosened from the shaft and the hub, whereby the two clamping members 25 and 26 may be drawn from each other so that they may be detached.

I claim:

1. An annular clamping member adapted to surround a shaft or to extend against an inner annular surface, said clamping member having a variable circumferential length; and constituted by a plurality of parts evenly distributed and including two opposite radial faces lying in opposite directions away from their positions when said member is at rest;

said member comprising a ring having two oppositely facing axial ends; and alternately arranged, axially displaceable primary and secondary sections at said ends; inclined ring portions mutually interconnecting said primary and secondary sections; said inclined ring portions being changeable in their inclination by the forced mutual displacement of said primary and secondary sections whereby the diameter of said clamping member can be increased or decreased.

2. A clamping member according to claim 1, further including an abutment member, one set of said sections having end faces lying in a common radial plane and adapted to contact said abutment member the other said of sections having end faces facing in the same direction and arranged at a distance from said radial plane and being mounted so as to forcibly be displaced in a direction toward said radial plane.

3. A clamping member according to claim 1, wherein one set of said sections has projections extending in the direction of the common radial plane of the end faces of the other set of sections; said clamping member further having separate sections having end faces situated in said common radial plane, and an abutment ring forming an abutment for one of said said faces, said abutment ring further having spacing means constituting stops for the end faces of the last set of sections.

4. A clamping member according to claim 3 wherein said spacing means are united with said abutment ring or fixed thereto and are rotatable relative to said clamping member.

5. A clamping member according to claim 1, comprising two cooperating clamping parts, one set of sections of one part serving as abutments to the corresponding set of sections of the other part whereas the other set of sections of the two members are mutually connected by tightening means for forcing said sections toward one another.

6. A clamping member according to claim 1, having a conical outer or inner circumferential surface for gripping the conical surface of an object to be clamped; said clamping member being adapted to fit within said object or upon said object.

7. A clamping member according to claim 6, having first and second clamping parts, the first of said parts having an outer conical surface and the second of said parts having an inner conical surface and outer clamping means at the end thereo; said second clamping part fitting around said first part with said primary and secondary sections thereof disposed opposite corresponding sections of said first parts; said second clamping part having at the end thereof a cross-section of diminished diameter axially displaceable relative to and in the opposite direction from said first clamping part.

8. A clamping member according to claim 7, wherein said first clamping part has sections at the end thereof which have an augmented diameter, said sections having side projections opposite corresponding sections at the opposite end of said second clamping part; said side projections having openings for fastening means.

9. A shaft coupling comprising two clamping members as defined in claim 5.

* * * * *